US012459061B2

(12) United States Patent
Lehman et al.

(10) Patent No.: US 12,459,061 B2
(45) Date of Patent: Nov. 4, 2025

(54) SYSTEM TO REPAIR SHEET METAL BARRIERS, INCLUDING DEVICES AND METHODS OF USE

(71) Applicant: Monarch Materials Group, Inc., Adel, IA (US)

(72) Inventors: Jarrad W. Lehman, Adel, IA (US); Andrew S. Kollenkark, Adel, IA (US)

(73) Assignee: Monarch Materials Group, Inc., Adel, IA (US)

( * ) Notice: Subject to any disclaimer, the term of this patent is extended or adjusted under 35 U.S.C. 154(b) by 0 days.

(21) Appl. No.: 18/968,616

(22) Filed: Dec. 4, 2024

(65) Prior Publication Data

US 2025/0178139 A1 Jun. 5, 2025

Related U.S. Application Data

(60) Provisional application No. 63/605,921, filed on Dec. 4, 2023.

(51) Int. Cl.
*B23P 6/00* (2006.01)

(52) U.S. Cl.
CPC .................................... *B23P 6/00* (2013.01)

(58) Field of Classification Search
CPC ........ E04F 19/062; E04F 13/06; E04F 13/141
See application file for complete search history.

(56) References Cited

U.S. PATENT DOCUMENTS

| | | | | |
|---|---|---|---|---|
| 2,348,658 | A * | 5/1944 | Slaughter | E04F 19/065 52/631 |
| 3,000,474 | A * | 9/1961 | Friedman | E04B 9/127 52/506.07 |
| 4,704,828 | A * | 11/1987 | Kemp | E04F 17/06 403/345 |
| 4,913,576 | A * | 4/1990 | Grant, Jr. | A47G 27/045 52/396.04 |
| 5,651,225 | A * | 7/1997 | Leeks | E04F 13/04 52/468 |
| 5,799,458 | A * | 9/1998 | Ferguson | E04F 13/04 52/712 |
| 6,637,170 | B2 * | 10/2003 | Ito | E04F 13/0864 248/220.21 |
| 7,028,444 | B2 * | 4/2006 | Wirth | E04B 2/721 52/461 |
| 9,631,377 | B2 * | 4/2017 | Browne | E04F 19/063 |
| 10,533,325 | B2 * | 1/2020 | Marinucci | E04F 19/062 |
| 10,774,859 | B2 * | 9/2020 | Lackore, Jr. | F16B 5/0028 |
| 11,124,975 | B1 * | 9/2021 | Bremer | B29C 48/21 |
| 11,891,812 | B2 * | 2/2024 | Mineo | E04F 13/0814 |
| 12,006,703 | B2 * | 6/2024 | Bremer | B29C 48/12 |
| 12,024,902 | B2 * | 7/2024 | Mineo | E04F 19/062 |
| 2002/0023398 | A1 * | 2/2002 | Ito | E04F 13/0864 52/234 |

(Continued)

*Primary Examiner* — Rodney Mintz
(74) *Attorney, Agent, or Firm* — DENTONS DAVIS BROWN PC; Matthew Warner-Blankenship

(57) ABSTRACT

Described herein are implementations of a system and related devices and methods for repairing damaged sheet material, typically the sheet metal retaining barrier of a basement window well. The disclosed material comprises a flexible, H-shaped or Y-shaped elongate body, referred to herein as a repair strip, that is used to connect two portions of sheet material.

20 Claims, 15 Drawing Sheets

(56) References Cited

U.S. PATENT DOCUMENTS

| | | | | |
|---|---|---|---|---|
| 2004/0200184 | A1* | 10/2004 | Wirth | E04F 21/18 52/782.1 |
| 2006/0000176 | A1* | 1/2006 | Taylor | E04F 19/065 52/461 |
| 2006/0123730 | A1* | 6/2006 | Wambaugh | E04F 13/06 52/522 |
| 2007/0000204 | A1* | 1/2007 | Wirth | E04B 2/7457 52/717.03 |
| 2007/0107348 | A1* | 5/2007 | Browne | E04F 19/063 52/417 |
| 2010/0024339 | A1* | 2/2010 | Tamlyn | E04B 2/7457 52/459 |
| 2010/0083599 | A1* | 4/2010 | Meulemans | E04F 19/062 52/287.1 |
| 2019/0003503 | A1* | 1/2019 | Lackore, Jr. | F16B 5/0642 |
| 2019/0048598 | A1* | 2/2019 | Marinucci | E04F 19/062 |
| 2022/0042325 | A1* | 2/2022 | Bremer | B29C 48/12 |
| 2022/0120097 | A1* | 4/2022 | Mineo | E04F 19/024 |
| 2022/0364370 | A1* | 11/2022 | Mineo | E04F 13/0814 |
| 2024/0175270 | A1* | 5/2024 | Mineo | E04F 13/0837 |
| 2024/0352749 | A1* | 10/2024 | Mineo | E04F 19/064 |

* cited by examiner

SYSTEM TO REPAIR SHEET METAL BARRIERS, INCLUDING DEVICES AND METHODS OF USE

CROSS-REFERENCES & RELATED APPLICATIONS

This application claims priority to U.S. Provisional Application No. 63/605,921 filed Dec. 4, 2023, and entitled "SYSTEM TO REPAIR SHEET METAL BARRIERS, INCLUDING DEVICES AND METHODS OF USE," which is hereby incorporated by reference in its entirety under 35 U.S.C. § 119(e).

TECHNICAL FIELD

The disclosure relates to construction and repair techniques generally and to systems to repair window wells and retaining walls specifically.

BACKGROUND

The disclosure relates to, among other things as would be appreciated in the art, repairing the sheet-metal retaining walls of basement egress window wells. In existing residential construction, concrete foundations are poured, and when applicable, basement egress window wells are installed. After the window wells are installed, the construction environment often causes damage to the steel window wells. Contractors use the egress opening to move heavy materials from outside to the interior foundation space. They often use the window wells as support for ladders, ramps, lumber and material handling equipment. Contractors often climb in and out of the well to access the interior foundation space. In addition, heavy equipment often comes into contact with the window wells. These factors result in damage along the top edge of the well.

Current industry practices have failed to protect the upper lip of the window well. For example, practices have included efforts to protect the top edge with vinyl protectors, adhesives, lumber and other materials; these methods are not adequate solutions. Current well repair methods include cutting out the damaged portion of the well and inserting a second well overlapping the existing well. The replacement piece is bolted to the foundation and often not adhered to the original well piece. This process is cumbersome and not embraced by the contractors due to resulting gaps between the wells and around the perimeter, including when wells are misshapen. As a result, home builders are often forced to dig out the window well and replace it with a new well.

BRIEF SUMMARY

Described herein are implementations of a system and related devices and methods for repairing damaged sheet material, typically the sheet metal retaining barrier of a basement window well. The disclosed material comprises a flexible, H-shaped or Y-shaped elongate body, referred to herein as a repair strip, that is used to connect two portions of sheet material. A contemplated method of repair is to cut away the bent, dented, or otherwise damaged top-portion of the sheet material to reveal undamaged material. The repair strip is then affixed to the top of the remaining material. Then, to replace the material that was trimmed away, a second piece of new sheet material is either affixed to the top of the repair strip or positioned to allow the repair strip to provide a seal between the two pieces of material.

Repairs done using this system avoid the full replacement of a damaged window well. This can result in a reduction in material cost, labor cost, and disruption to the surrounding yard. This system also allows for the repair of window wells where the well is formed with two seam-welded steel sheets, and where the weld has broken. The system also can provide a repaired well that does not contain gaps between the sheet material segments, which can allow water, dirt and pests into the window well.

In Example 1, a repair strip for securing sheet material, comprising an elongate body comprising an inside upper flange; an outside lower flange; an inside lower flange; a web connecting the outside upper flange, the inside upper flange, the outside lower flange, and an inside lower flange; a first opening defined longitudinally along substantially the length of the web between the outside upper flange and inside upper flange; and a second opening defined longitudinally along substantially the length of the web between the outside lower flange and inside lower flange, wherein the first and second openings are sized and configured to grip sheet material.

In Example 2, the repair strip of Example 1, wherein the elongate body comprises flexible material.

In Example 3, the repair strip of Example 1, wherein each of the first and second openings comprises a narrow portion distal to the web; and an open portion proximal to the web.

In Example 4, the repair strip of Example 1, further comprising a plurality of fingers extending into the first opening and second opening.

In Example 5, the repair strip of Example 4, wherein the plurality of fingers is angled toward the web.

In Example 6, the repair strip of Example 1, wherein the outside upper flange extends beyond the inside upper flange.

In Example 7, the repair strip of Example 1, wherein the outside lower flange extends beyond the inside lower flange.

In Example 8, the repair strip of Example 6, wherein the outside upper flange further comprises a lip.

In Example 9, a method for repairing damaged sheet material, comprising inserting the repair strip of Example 1 between first and second pieces of sheet material.

In Example 10, a method of repairing sheet material, comprising: inserting a repair strip device comprising an elongate body having first and second longitudinal openings between first and second sections of sheet material.

In certain implementations of the claimed material, the material is an apparatus for securing sheet material comprising one or more elongate bodies, each having an outside upper flange, an inside upper flange, an outside lower flange, and an inside lower flange; a first opening between the outside upper flange and inside upper flange of each elongate body; and a second opening between the outside lower flange and inside lower flange of each elongate body, wherein said first and second opening are of appropriate width to grip the sheet material.

In further implementations of the claimed material, the apparatus is flexible.

In certain implementations of the claimed material, the material is an apparatus for securing sheet material comprising one or more elongate bodies, each having an outside upper flange, an inside upper flange, an outside lower flange, and an inside lower flange; a first opening between the outside upper flange and inside upper flange of the elongate body, which further comprises a narrow portion near the outermost portion of the first opening and an opening portion near the innermost portion of the first opening; and a second opening between the outside lower flange and inside lower flange of the elongate body, which further comprises a narrow portion near the outermost portion of the second opening and an opening portion near the innermost portion of the second opening.

In certain implementations of the claimed material, the material is a method for repairing damaged sheet material comprising cutting away the damaged portion of the sheet material, revealing a freshly-cut section; inserting the freshly-cut section into the first opening of an elongate body, having a first opening on one side, and having a second opening on the side opposite of the first opening; and inserting a new piece of sheet material into said second opening.

While multiple embodiments are disclosed, still other embodiments of the disclosure will become apparent to those skilled in the art from the following detailed description, which shows and describes illustrative embodiments. As will be realized, the disclosure is capable of modifications in various obvious aspects, all without departing from the spirit and scope of the disclosure. Accordingly, the drawings and detailed description are to be regarded as illustrative in nature and not restrictive.

DETAILED DESCRIPTION

Figure 1A:
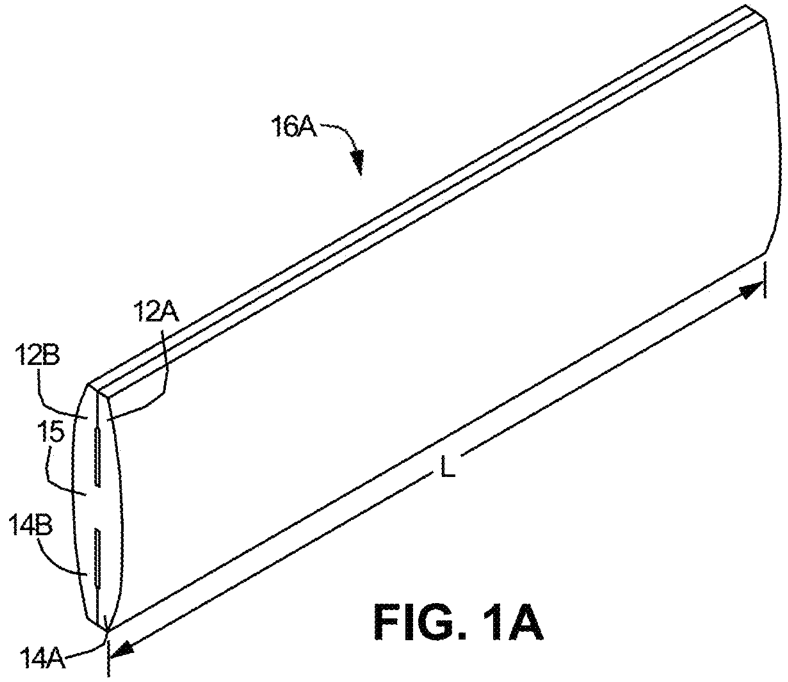
FIG. 1A shows an isometric view of an apparatus employed in the system, according to one implementation.

Shown in FIGS. 1A-1C, 2A-2C, and 3A-3C, the disclosed system 1 comprises, in part, a flexible, elongate body 10, also referred to as a repair strip 10. In these implementations, the repair strip 10 has an outside upper flange 12A, an inside upper flange 12B, an outside lower flange 14A, and an inside lower flange 14B. In various implementations, the repair strip 10 has a web 15 that joins the outside upper flange 12A, the inside upper flange 12B, the outside lower flange 14A, and the inside lower flange 14B together. The longitudinal distance of the repair strip 10 is shown at length L. In various implementations, the length L runs the full distance of the placement area 30, which will be described below. In further implementations, users may adjust the length L by means of cutting, breaking, or otherwise severing the repair strip 10 as desired. In various implementations, there is an upper opening 16A positioned between the outside upper flange 12A and the inside upper flange 12B that runs substantially the length L of the body 10. In various implementations, there is a lower opening 16B positioned between the outside lower flange 14A and the inside lower flange 14B that runs substantially the length L of the body 10. In various implementations, the upper opening 16A and the lower opening 16B are on substantially opposite sides of the repair strip 10 from one another. It is readily appreciated that the repair strip 10 according to these implementations is designed to be cut to length for use.

Figure 1B:
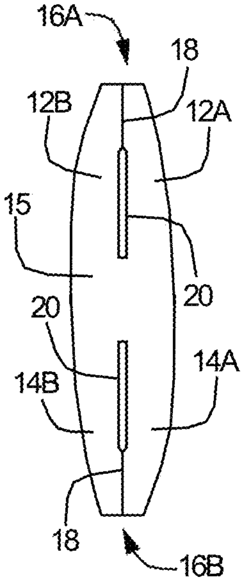
FIG. 1B shows an end-on view of an apparatus employed in the system, according to one implementation.
Figure 1C:
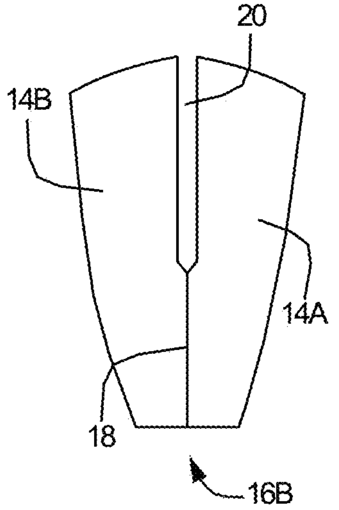
FIG. 1C shows a close-up, end-on view of an apparatus employed in the system, according to one implementation.

In the implementation of FIG. 1A-1C, the repair strip 10 is constructed as described above. As can be seen in FIG. 1B, in various implementations, the openings 16A, 16B can each comprise multiple portions of varied width, such as a narrow portion 18 and an open portion 20. Typically, the narrow portion 18 provides frictional forces against the surface of the sheet material 26. In other implementations, the narrow portion 18 and open portion 20 can be the same width.

Figure 2A:
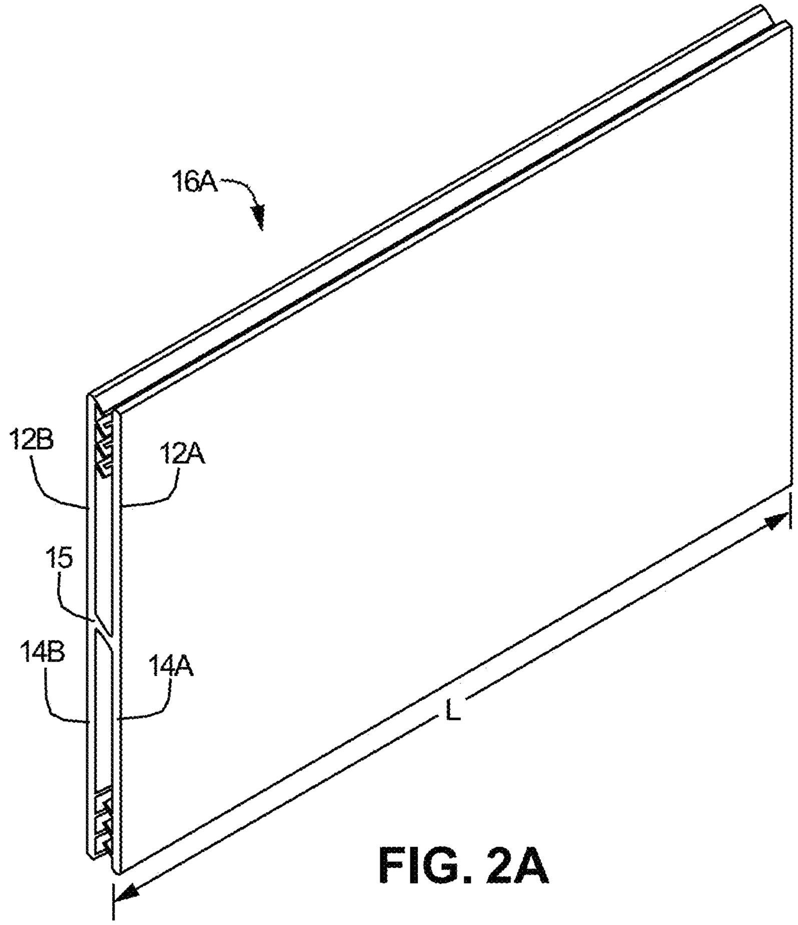
FIG. 2A shows an isometric view of an apparatus with a plurality of fingers employed in the system, according to one implementation.
Figure 2B:
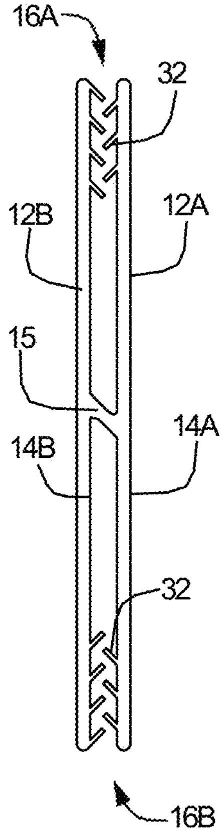
FIG. 2B shows an end-on view of an apparatus with a plurality of fingers employed in the system, according to one implementation.
Figure 2C:
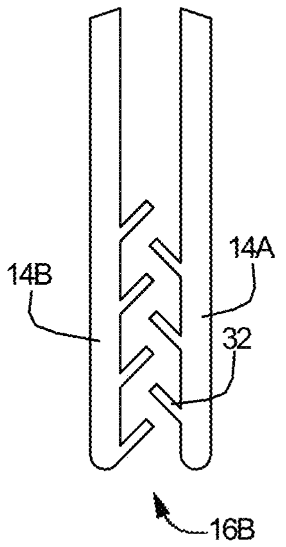
FIG. 2C shows a close-up, end-on view of an apparatus with a plurality of fingers employed in the system, according to one implementation.

In the implementation of FIGS. 2A-2C, there can be a plurality of fingers 32 attached to the flanges 12A, 12B, 14A, 14B. In various implementations, these fingers 32 are ridges protruding from the flanges 12A, 12B, 14A, 14B into the upper opening 16A or lower opening 16B and run substantially the length of the repair strip 10, L. In various implementations, the plurality of fingers 32 are angled toward the web 15. In various implementations, the plurality of fingers 32 are a plurality of protuberances where each protuberance is an elongate mass of material extending from the flanges 12A, 12B, 14A, 14B into the upper opening 16A or lower opening 16B.

Figure 3A:
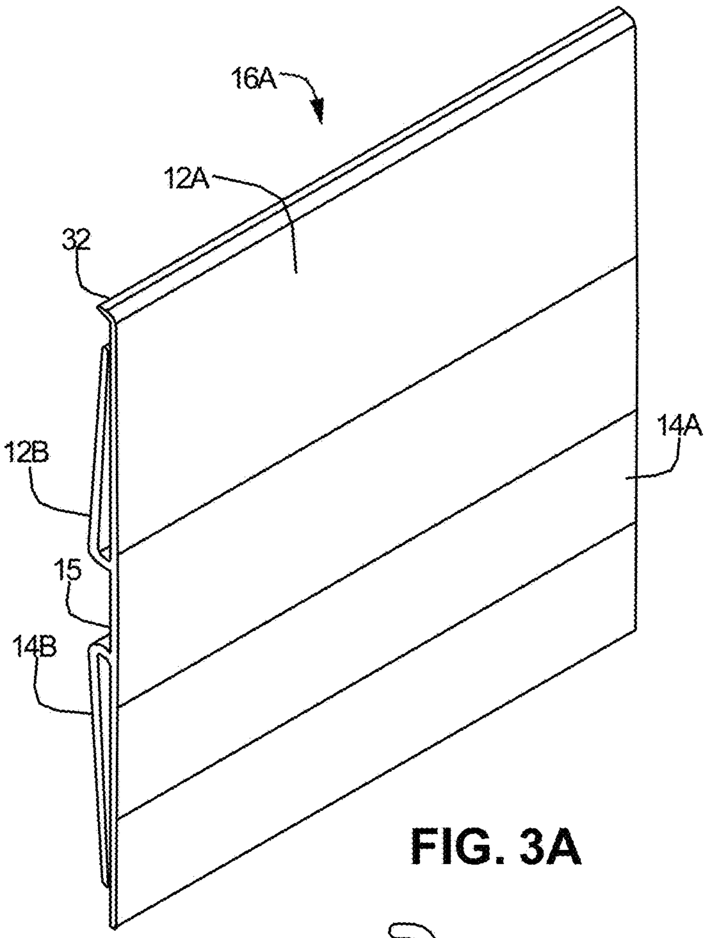
FIG. 3A shows an isometric view of an apparatus with uneven flanges employed in the system, according to one implementation.
Figure 3B:
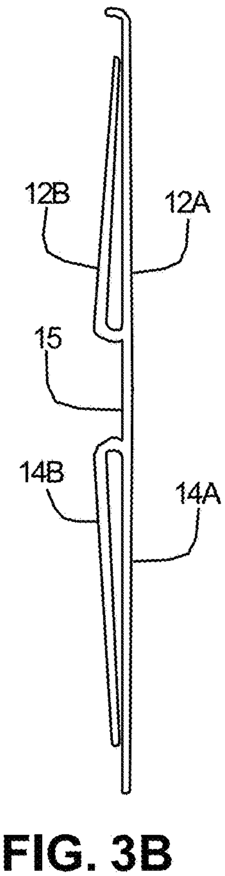
FIG. 3B shows an end-on view of an apparatus with uneven flanges employed in the system, according to one implementation.
Figure 3C:
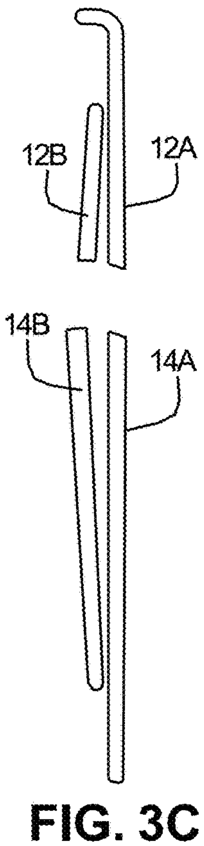
FIG. 3C shows a close-up, end-on view of the apparatus with uneven flanges employed in the system, according to one implementation.

In the implementation of FIGS. 3A-3C, the outside upper flange 12A can extend beyond the inside upper flange 12B and can have a lip 34 near its end opposite of the web 15, where the lip 34 can be a substantially 90-degree bend in the outside upper flange 12A toward the upper opening 16A. In various implementations, the outside lower flange 14A can extend beyond the inside lower flange 14B.

Figure 4:
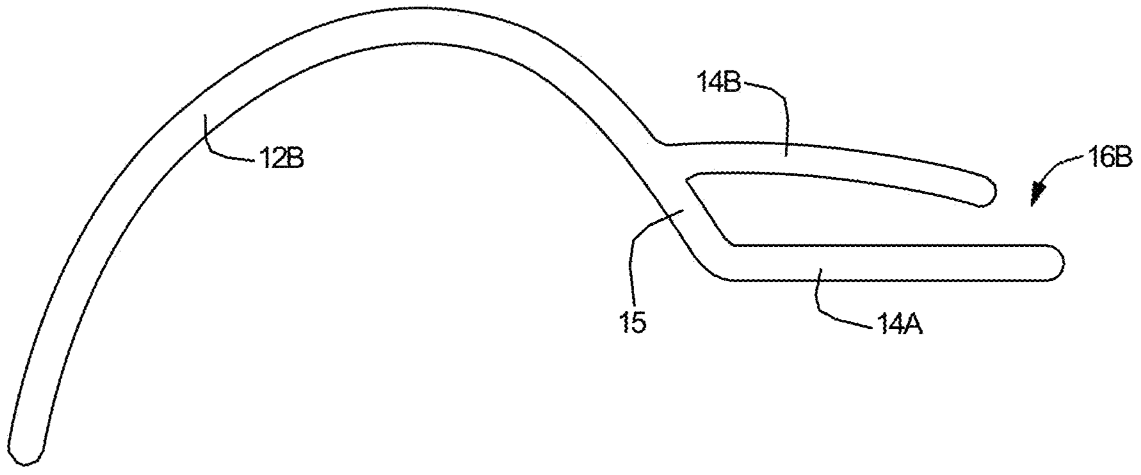
FIG. 4 shows a cross-section of an apparatus employed in the system, according to one implementation.

Turning to FIG. 4, in various implementations, the repair strip 10 has an outside lower flange 14A, an inside lower flange 14B, and an inside upper flange 12B, but does not have an outside upper flange 12A. In such an implementation, the outside lower flange 14A and inside lower flange 14B form a lower opening 16B.

Figure 5:
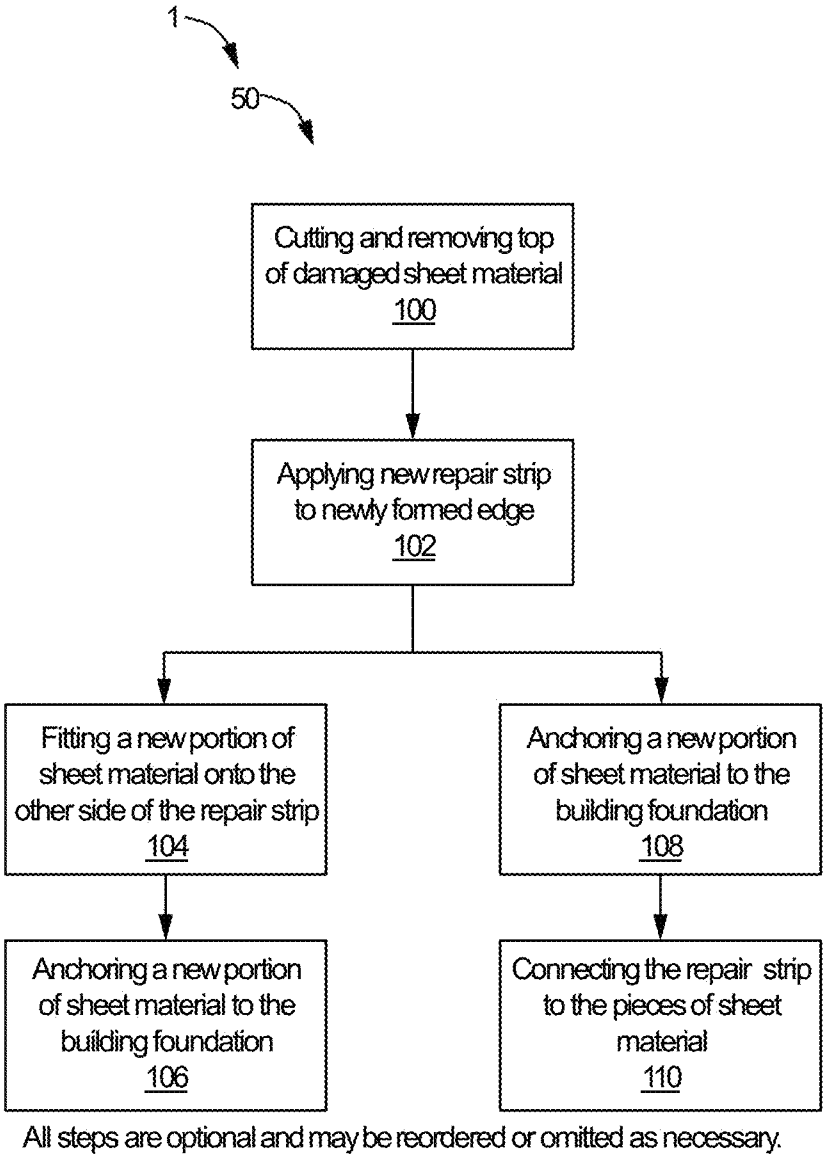
FIG. 5 is a flow diagram of a method employed in the system to repair damaged sheet material, according to one implementation.
Figure 6:
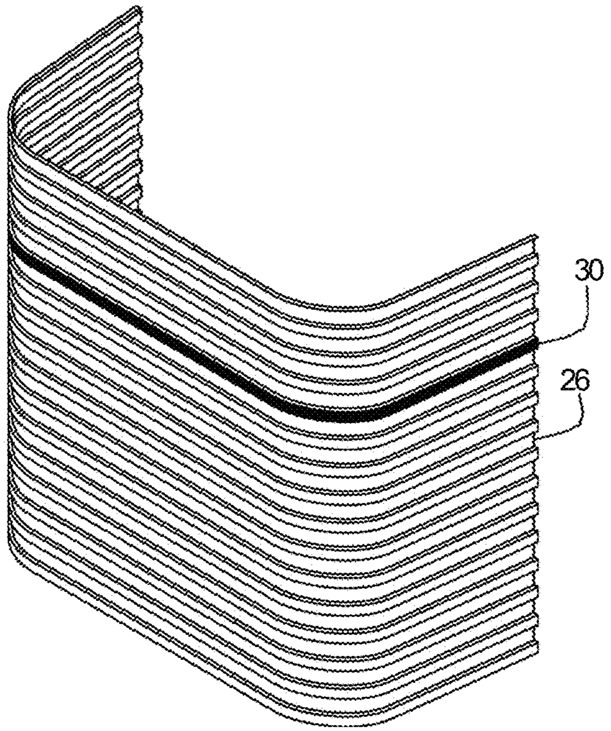
FIG. 6 shows a piece of sheet material with a dark line showing where the elongate body would be installed, according to one implementation.
Figure 7A:
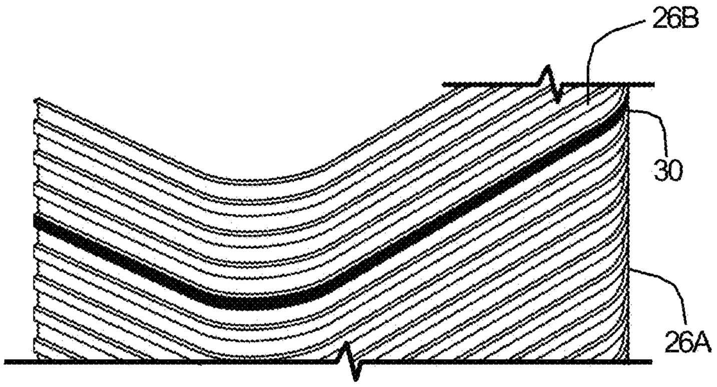
FIG. 7A shows a close-up isometric view of the repair strip placement area, according to one implementation.
Figure 7B:
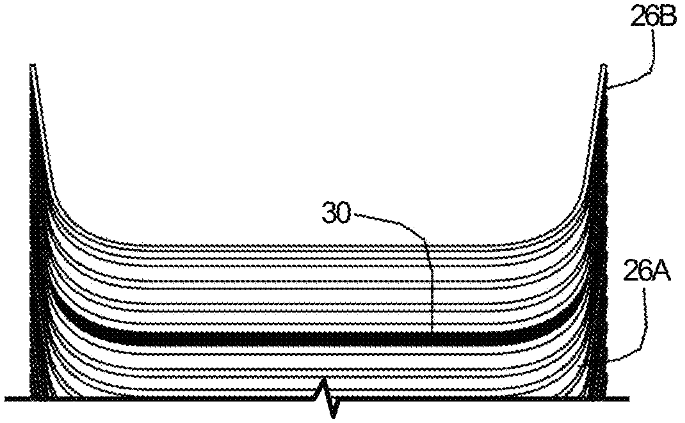
FIG. 7B shows a straight-on, close-up view of the repair strip placement area, according to one implementation.

As shown in FIG. 5, the system 1 according to certain implementations also comprises a method 50 of employing the repair strip 10 to repair and or extend sections of thin sheet material 26, like that shown in FIGS. 6, 7A, and 7B, which shows the placement area 30 for the repair strip 10. Other areas are of course possible.

In some implementations, these sections of thin sheet material 26 are made of metal, though other materials such as plastic, composite, fiberglass or similar materials understood in the art are of course possible. Typically, these sections 26 of thin sheet material are retaining walls around window wells for windows below, or partially below, ground level.

In various implementations, the flanges 12A, 12B, 14A, 14B can be secured by to the sheet material 26 using a connector 36. The connector 36 can be a pin, nail, screw, tack, clip, glue, adhesive backing, cement, or other device or substance that would be understood in the art as capable of equivalently connecting two objects.

Figure 8:
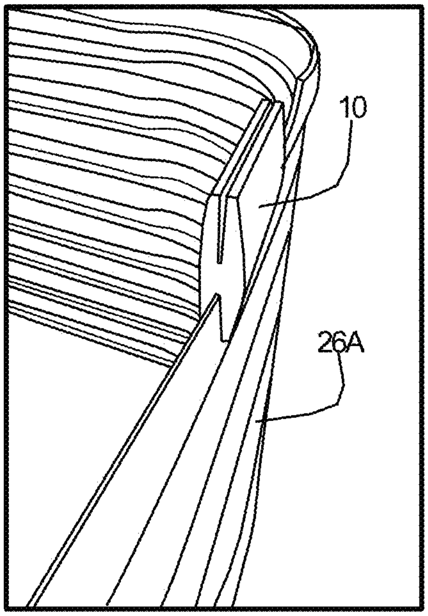
FIG. 8 shows a portion of repair strip fitted onto sheet material, according to one implementation.
Figure 9:
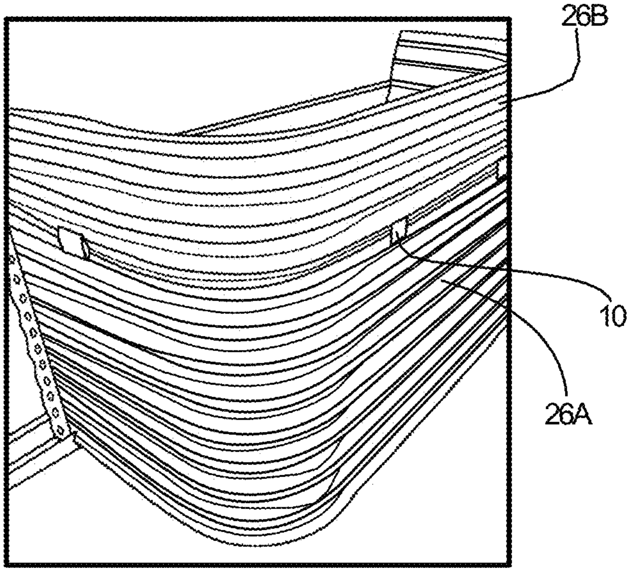
FIG. 9 shows portions of repair strip connecting two pieces of sheet material from the front, according to one implementation.
Figure 10:
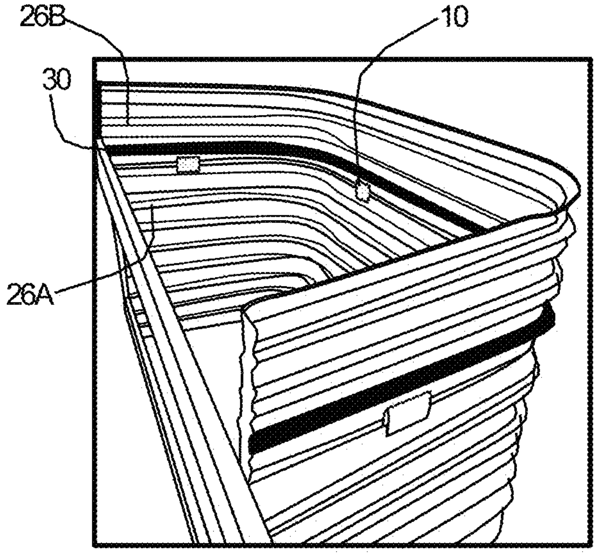
FIG. 10 shows portions of repair strip connecting two pieces of sheet material, viewed from behind, according to one implementation.
Figure 11A:
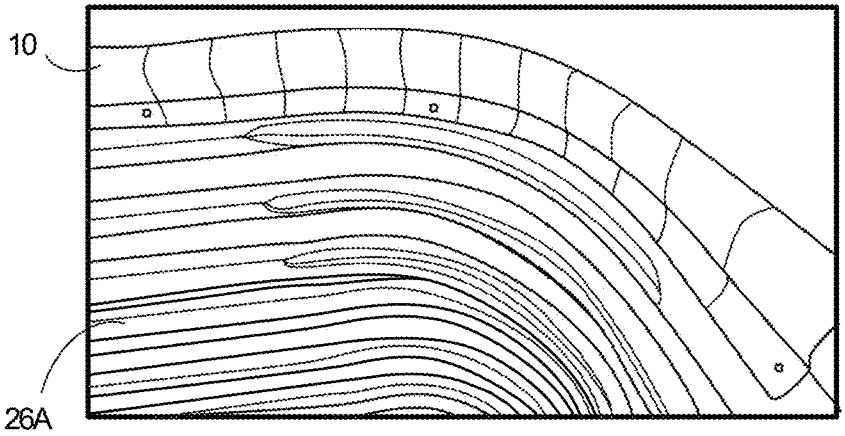
FIG. 11A shows the repair strip fitted onto sheet material, where the repair strip only has three flanges, according to one implementation.
Figure 11B:
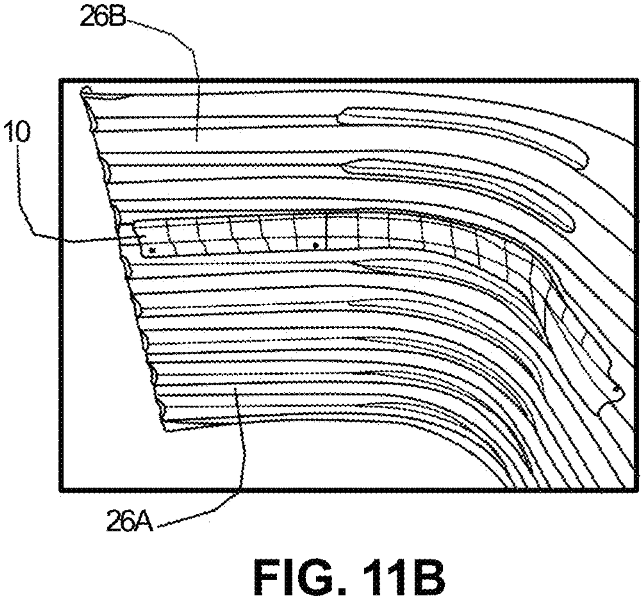
FIG. 11B shows the repair strip fitted between two pieces of sheet material, where the repair strip only has three flanges, according to one implementation.

Turning back to FIG. 5, the employment of the repair strip 10 typically begins by cutting away a damaged portion of the sheet material 26 (box 100). The repair strip 10 is then applied to a newly cut section 26A of the sheet material by inserting that sheet material into one of openings 16B (box 102), as is shown for example in FIG. 8. In implementations like those shown in FIGS. 1A-C, 2A-C and 3A-C, a second section 26B of sheet material is then inserted into the opposite opening 16A such that the second section 26B of sheet material occupies approximately the same position the damaged sheet material did before the damage was sustained (box 104), as is shown in FIGS. 9 and 10. In implementations where the repair strip 10 does not have an outside upper flange 14A, such as those shown in FIG. 4, the inside upper flange 12B can be curved outward when the repair strip 10 is positioned on the first section 26A of sheet material. FIG. 11A shows one implementation like this, where the repair strip is positioned on top of the first section 26A of sheet material and the inside upper flange 12B is curved outward. FIG. 11B shows this implementation where the second section 26B of sheet material has been positioned above the first section 26A, and the inside upper flange 12B is pressed against the second section 26B due to its curvature. In various implementations where the inside upper flange 12B is pressed against the second section 26B of sheet material due to the curvature of the inside upper flange 12B, the contact of the inside upper flange 12B and second section 26B of sheet material can form a watertight seal. In other implementations configured as in FIG. 4, the repair strip 10 can be curved to match any curvature or corrugations of the sheet material 26. In various implementations, the repair strip 10 may be applied to the second section 26B of sheet material before the repair strip 10 is applied to the first section 26A of sheet material. Optionally, the second section 26B of sheet material can then be anchored to the building foundation, or otherwise secured to a structure (box 106). In some implementations like the one shown in FIG. 12, the sheet material 26 is anchored to the building foundation or other relevant structure using anchors 38. In various implementations, the anchors 38 can be wedge concrete anchors, stud concrete anchors, concrete sleeve anchors, split drive concrete anchors, lag shield concrete anchors, concrete screws, through-bolts, or other devices and methods known in the art to secure objects equivalently.

Returning to FIG. 5, in implementations like those shown in FIG. 4, rather than inserting the second section 26B of sheet material into the opening 16A of the repair strip 10 (box 104), the second section 26B of sheet material can be anchored to the building foundation, or otherwise secured to a structure (box 108). Optionally, the repair strip 10 can be secured to the sheet material 26 by the connector 36 (box 110). FIG. 11A shows an implementation of the repair strip 10 applied to the first section 26A of sheet material. FIG. 11B shows an implementation of the repair strip 10 applied to the first section 26A of sheet material with the second section 26B of sheet material in place. Other steps of the method 50 may be reordered as necessary without stepping outside of the scope of the disclosure.

In various implementations, after the preceding steps have been completed, dirt is filled in around the sheet material 26, and the now-installed repair body 10 provides a seal between the first section 26A and second section 26B of sheet material. The seal prevents moisture, dirt, pests, and other material from passing through the gap between the first section 26A and second section 26B of sheet material.

Figure 12:
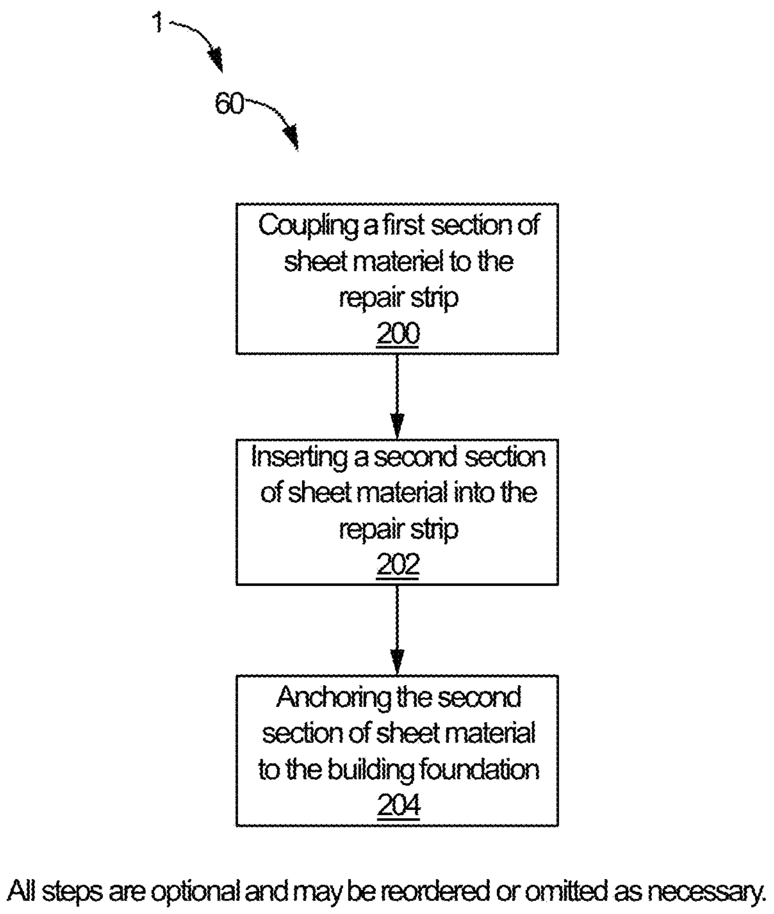
FIG. 12 is a flow diagram of a method employed in the system to connect pieces of sheet material, according to one implementation.

FIG. 12 shows a simplified method 60, where in some implementations the sheet material 26 in place has no damaged portion. Such implementations can have a step of coupling a first section 26A of sheet material to a repair strip 10 (box 200). In various implementations, the repair strip 10 can be coupled to the first section 26A of sheet material by inserting the first section 26A into an opening 16B. A second section 26B of sheet material can, in some implementations, be inserted into another opening 16A disposed in the repair strip 10 (box 202). In various implementations, the second section 26B of sheet material can then be anchored to the foundation of a building (box 204).

Figure 13:
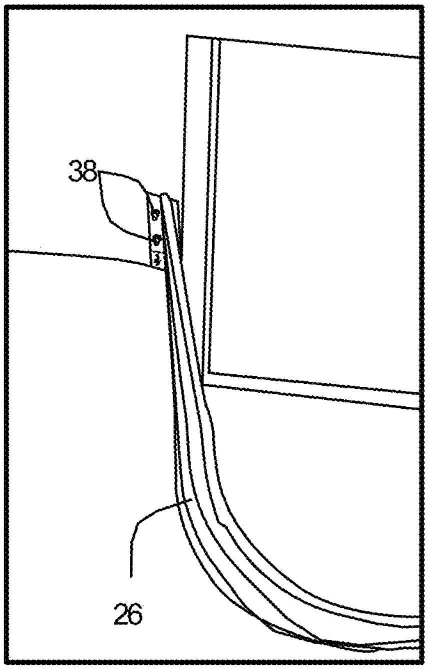
FIG. 13 shows an example of damaged sheet material at a construction site, according to one implementation.
Figure 14:
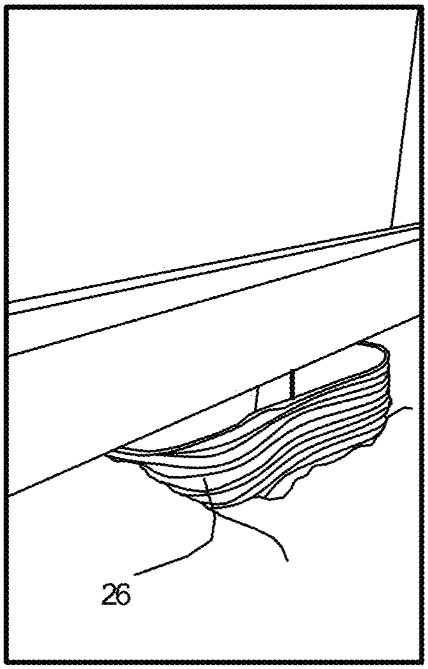
FIG. 14 shows a close-up of the left side of damaged sheet material at a construction site, according to one implementation.
Figure 15:
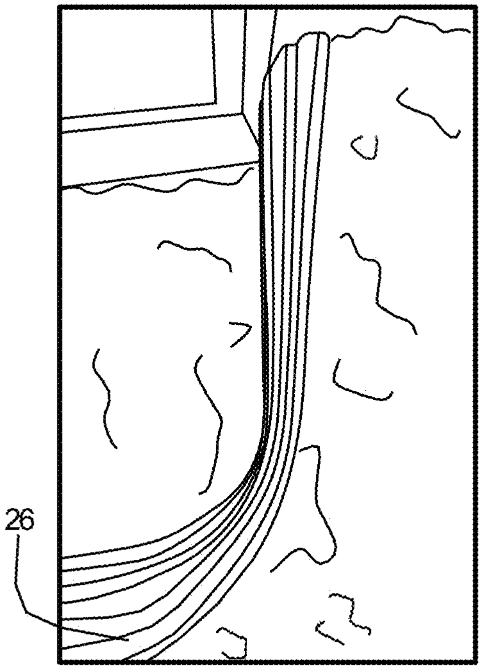
FIG. 15 shows a close-up of the right side of damaged sheet material at a construction site, according to one implementation.

FIGS. 13, 14, and 15 all show an example of damaged sheet material 26 that would be a candidate for repairs facilitated by the system 1. It would be understood in the art that the system 1 could also be applied to various other situations beyond those shown in FIGS. 13, 14, and 15.

Although the disclosure has been described with reference to preferred embodiments, persons skilled in the art will recognize that changes may be made in form and detail without departing from the spirit and scope of the disclosed apparatus, systems and methods.

What is claimed is:

1. A repair strip for securing sheet material, consisting of: an elongate body having:

(a) an outside upper flange;

(b) an inside upper flange;

(c) an outside lower flange;

(d) an inside lower flange;

(e) a web connecting the outside upper flange, the inside upper flange, the outside lower flange, and the inside lower flange;

(f) a first opening defined longitudinally along substantially a length of the web between the outside upper flange and the inside upper flange; and (g) a second opening defined longitudinally along substantially the length of the web between the outside lower flange and the inside lower flange, wherein each of the first and second openings consists of a narrow portion distal to the web and an open portion proximal to the web, and wherein the first and second openings are sized and configured to grip the sheet material.

2. A repair strip for securing sheet material, comprising: an elongate body comprising:

(a) an outside upper flange;

(b) an inside upper flange;

(c) an outside lower flange;

(d) an inside lower flange;

(e) a web connecting the outside upper flange, the inside upper flange, the outside lower flange, and the inside lower flange;

(f) a first opening defined longitudinally along substantially a length of the web between the outside upper flange and the inside upper flange; and (g) a second opening defined longitudinally along substantially the length of the web between the outside lower flange and the inside lower flange, wherein each of the first and second openings comprises a narrow portion distal to the web, an open portion proximal to the web and a plurality of fingers extending into each said opening, and wherein the first and second openings are sized and configured to grip the sheet material.

3. The repair strip of claim 2, wherein the elongate body comprises flexible material.

4. The repair strip of claim 2, wherein the plurality of fingers is angled toward the web.

5. The repair strip of claim 2, wherein the outside lower flange extends beyond the inside lower flange.

6. The repair strip of claim 2, wherein the outside upper flange extends beyond the inside upper flange.

7. The repair strip of claim 6, wherein the outside upper flange further comprises a lip.

8. A system for repairing damaged sheet material comprising:

first and second sections of said sheet material; and a repair strip, the repair strip comprising:

an elongate body comprising (a) an inside upper flange;

(b) an outside lower flange;

(c) an inside lower flange; and (d) a web connecting the inside upper flange, the outside lower flange, and the inside lower flange;

wherein the first section of the sheet material is secured between the inside lower flange and the outside lower flange and the second section of the sheet material is placed in direct contact with the inside upper flange.

9. The system of claim 8, wherein each section of the sheet material comprises sheet metal.

10. The system of claim 8, wherein the inside upper flange is secured to the second section of the sheet material.

11. The system of claim 10, wherein the inside upper flange is secured to the second section of the sheet material with an adhesive backing on the inside upper flange.

12. The system of claim 10, wherein the inside upper flange is secured to the second section of the sheet material with a pin.

13. The system of claim 10, wherein the inside lower flange and the outside lower flange are secured to the first section of the sheet material with an adhesive backing on the inside lower flange and the outside lower flange.

14. A method of repairing sheet material, consisting of:

providing the repair strip of claim 1;

coupling a first section of the sheet material to the elongate body having the first longitudinal opening and the second longitudinal opening by inserting the first section of the sheet material into the first longitudinal opening; and inserting a second section of the sheet material into the second longitudinal opening.

15. A method of repairing sheet material, comprising:

providing the repair strip of claim 2;

coupling a first section of the sheet material to the elongate body comprising the first longitudinal opening and the second longitudinal opening by inserting the first section of the sheet material into the first longitudinal opening; and inserting a second section of the sheet material into the second longitudinal opening.

16. The method of claim 15, wherein the elongate body comprises flexible material.

17. The method of claim 15, wherein each section of the sheet material comprises sheet metal.

18. The method of claim 15, further comprising anchoring the second section of the sheet material to a building foundation.

19. The method of claim 18, wherein the elongate body comprises a lip angled over the first longitudinal opening.

20. The method of claim 18, wherein the elongate body comprises a lip angled over the second longitudinal opening.

* * * * *